(12) United States Patent
Bisker

(10) Patent No.: US 10,692,214 B2
(45) Date of Patent: Jun. 23, 2020

(54) METHOD AND APPARATUS TO GENERATE AND TRACK STANDARDIZED ANATOMICAL REGIONS AUTOMATICALLY

(71) Applicant: Canfield Scientific, Incorporated, Parsippany, NJ (US)

(72) Inventor: Oleg Bisker, Warren, NJ (US)

(73) Assignee: Canfield Scientific, Incorporated, Parsippany, NJ (US)

( * ) Notice: Subject to any disclaimer, the term of this patent is extended or adjusted under 35 U.S.C. 154(b) by 0 days.

(21) Appl. No.: 16/045,551

(22) Filed: Jul. 25, 2018

(65) Prior Publication Data

US 2019/0035080 A1    Jan. 31, 2019

Related U.S. Application Data

(60) Provisional application No. 62/537,420, filed on Jul. 26, 2017.

(51) Int. Cl.
*G06T 7/00* (2017.01)
*G06T 7/33* (2017.01)
*G06T 7/73* (2017.01)
*G06K 9/32* (2006.01)
(Continued)

(52) U.S. Cl.
CPC .......... *G06T 7/0016* (2013.01); *G06K 9/3233* (2013.01); *G06K 9/6202* (2013.01); *G06T 7/344* (2017.01); *G06T 7/74* (2017.01); *G06T 7/75* (2017.01); *G06T 17/20* (2013.01); *G06K 2009/6213* (2013.01); *G06T 2207/10028* (2013.01); *G06T 2207/30088* (2013.01); *G06T 2207/30201* (2013.01)

(58) Field of Classification Search
None
See application file for complete search history.

(56) References Cited

U.S. PATENT DOCUMENTS 8,698,795 B2 * 4/2014 Grewer ..................... G06T 7/11
345/419
2009/0238460 A1 9/2009 Funayama et al.
(Continued)

OTHER PUBLICATIONS

Y. Wang et al., High Resolution Tracking of Non-Rigid Motion of Densely Sampled 3D Data Using Harmonic Maps, Int. J. Comput. Vis., Jul. 14, 2007, pp. 283-300.
(Continued)

*Primary Examiner* — YuJang Tswei

(57) ABSTRACT

Methods and apparatus are disclosed that assist a user in tracking changes that occur in an anatomical region of one or more subjects based on three-dimensional images of the region captured at different times, such as before and after treatment. In exemplary implementations, a three-dimensional anatomical reference model derived from a population of relevance to the subjects is deformed to fit at least a baseline image of each of the subjects. The deformed model of each subject's baseline image is further deformed to fit a follow-up image of the subject's anatomical region. The deformed models thus generated are used to establish sparse correspondences between the images from which surrounding, denser correspondences between the images are additionally found.

59 Claims, 7 Drawing Sheets

(51) Int. Cl.
  *G06K 9/62*   (2006.01)
  *G06T 17/20*  (2006.01)

(56) References Cited

U.S. PATENT DOCUMENTS

2016/0217319 A1* 7/2016 Bhanu ................ G06K 9/00288
2017/0024907 A1* 1/2017 Bermano ........... G06K 9/00604

OTHER PUBLICATIONS

T. Fang et al., 3D/4D facial expression analysis: An advanced annotated face model approach, Image and Vis. Comput. 30, Feb. 2, 2012, pp. 738-749.
C. M. Grewe, Fully Automated and Highly Accurate Dense Correspondence for Facial Surfaces, Springer 2016, pp. 552-568.
Y. Furukawa, Dense 3D Motion Capture for Human Faces, CVPR Jan. 2009.
International Search Report, PCT/US2018/043787, dated Oct. 19, 2018.
Written Opinion of the International Searching Authority, PCT/US2018/043787, dated Oct. 19, 2018.

* cited by examiner

METHOD AND APPARATUS TO GENERATE AND TRACK STANDARDIZED ANATOMICAL REGIONS AUTOMATICALLY

RELATED APPLICATIONS

This Application claims priority from U.S. Provisional Patent Application No. 62/537,420, filed Jul. 26, 2017, and incorporated herein by reference in its entirety.

BACKGROUND INFORMATION

In assessing the efficacy of treatments that affect the skin of a human subject, common techniques have included capturing images of the subject's skin at various points during the course of treatment, and comparing the images. Without such comparisons, the efficacy of skin treatments—whether cosmetic or medical skin care, the application of products, skin care regimens, or skin procedures—is difficult to assess, particularly where the effects are gradual or subtle.

The comparison of images of a subject's skin is complicated, however, when there are significant differences in the images, such as may be due to the lighting conditions in which the images were captured, movement, pose, orientation, and the shape of the area being imaged (such as may be due to treatment, inhalation/exhalation, facial expression, etc.), among other factors.

The comparison of images for assessing the efficacy of skin treatments is further complicated where multiple subjects are involved, as in studies or clinical trials. Such applications typically also demand a high degree of precision and consistency, with objective, quantifiable results.

SUMMARY OF THE DISCLOSURE

The present disclosure relates to image processing and analysis, particularly the tracking of a region on the surface of an object over multiple three-dimensional (3D) images of the object captured at different times.

The present disclosure sets out an apparatus comprising: a storage device containing instructions; and a processor for executing the instructions to: obtain a reference model including a reference anatomical region; obtain first and second images of a subject anatomical region corresponding to the reference anatomical region, the second image having been captured after the first image; determine a correspondence relationship between the first and second images by using the reference model; and control a display device to display at least one of the first and second images so as to indicate the correspondence relationship.

The present disclosure also sets out a method performed by an anatomical imaging apparatus comprising: obtaining a reference model including a reference anatomical region; obtaining first and second images of a subject anatomical region corresponding to the reference anatomical region, the second image having been captured after the first image; determining a correspondence relationship between the first and second images by using the reference model; and controlling a display device to display at least one of the first and second images so as to indicate the correspondence relationship.

A non-transitory computer-readable medium for execution by a processor for carrying out the aforementioned method is also provided herein.

These and other aspects of the present disclosure are shown and described below in greater detail.

DETAILED DESCRIPTION

Figure 1:
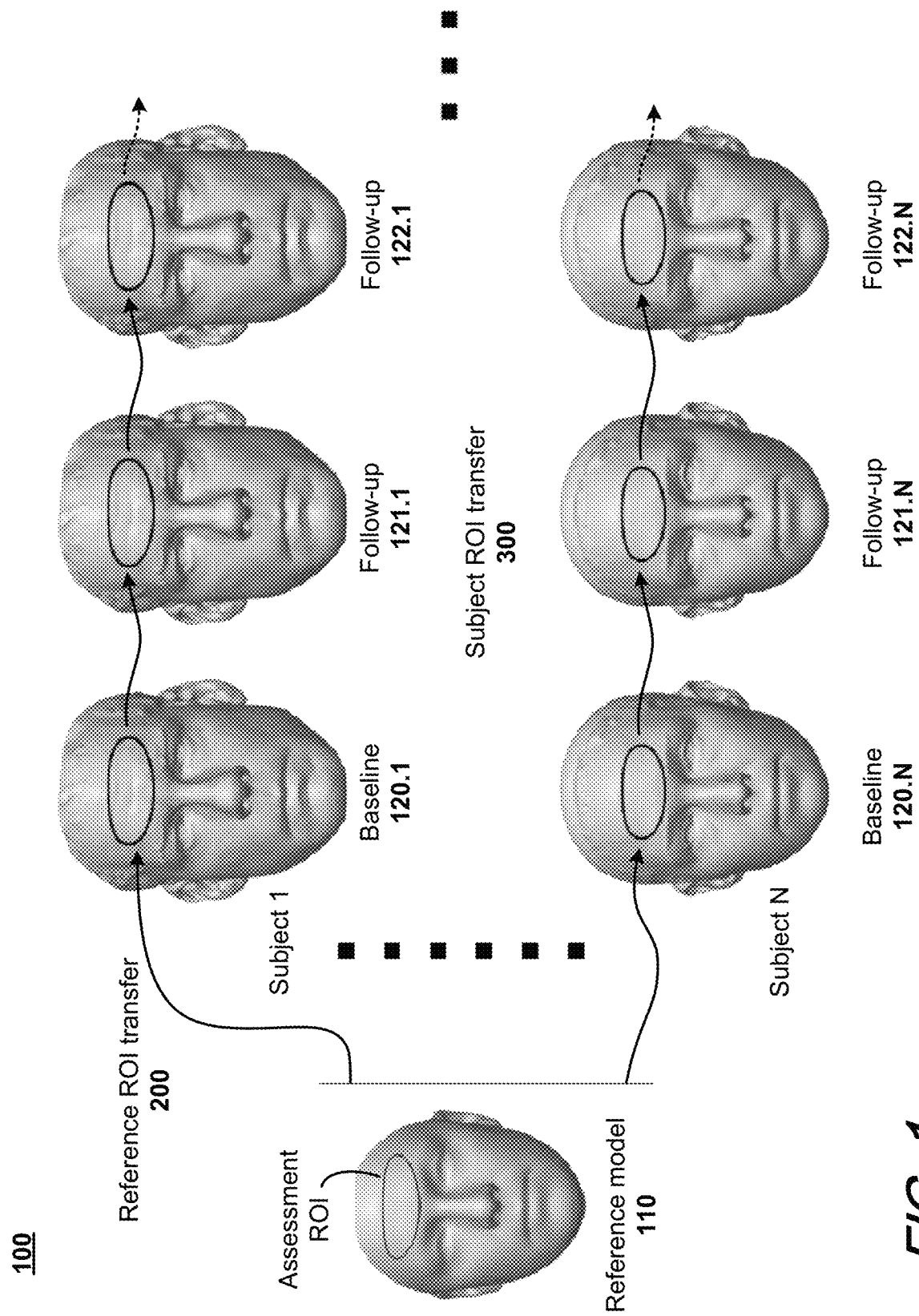
FIG. 1 is a schematic depiction of an exemplary method in accordance with the present disclosure.

FIG. 1 schematically depicts an exemplary method 100 of the present disclosure for tracking an anatomical region of one or more subjects over multiple images of the anatomical region acquired at different times. The exemplary method 100 includes a computer implemented procedure 200 for transferring a region of interest (ROI) from a 3D anatomic shape reference model 110 to a baseline 3D image 120 of each of N subjects. In exemplary applications, it is contemplated that the ROI represents a region on the surface of an anatomic part, area or section, such as a face, that may have undergone change, such as may occur with treatment, and in which the efficacy of the treatment is to be assessed based on the analysis of sequentially captured images of the anatomic area of one or more subjects. Transferring the ROI from the 3D anatomic shape reference model 110 to baseline images 120 serves to provide a standardized ROI that can be used with multiple subjects, such as in a clinical study or trial, for example. For applications involving a single subject, the ROI can be defined using the reference model 110 or the baseline 3D image 120 of the subject. An exemplary implementation of procedure 200 for transferring an ROI from a 3D anatomic shape reference model 110 to a baseline 3D image 120 of each of N subjects is described below in greater detail with reference to FIG. 2.

In exemplary implementations, the 3D anatomic shape reference model 110 comprises an average anatomic shape and an encoding of possible shape variance derived from a training set of multiple 3D images of the desired anatomic area (e.g., face) of multiple individuals, which may or may not include any of the N subjects whose images are to be processed in accordance with the exemplary method.

3D anatomic shape reference model 110 can be generated in a variety of ways. Preferably, the model is generated using a large population that encodes the greatest variety of shape. In the exemplary implementations shown in which the anatomic shape is a face, the average face shape that is part of the model represents a starting point from which the model, which can be thought of as a face mask, is deformed to best match a 3D image of a subject's face. Consider, for example, the location of a single point on the face, e.g., the tip of the nose, plotted in 3D for each member of the population. The average position of these nose-tip points is the location of the nose-tip on the average anatomic face, and the variance of the distribution of nose-tips is indicative of the likelihood of the nose-tip of a subject's face being some distance/direction away from the average face nose-tip. As part of the shape reference model 110, this variance information describes plausible shapes (i.e., shape space) into which the model can be deformed in the process of fitting it to a subject's face. In such a fitting process, starting with the average face shape, the reference model 110 is deformed into the subject's face based on plausible shape variation, while penalizing deforming into a shape that, based on the variance information, would be considered an outlier.

In an exemplary implementation, the population used for deriving reference model 110 includes both sexes, a variety of ethnicities, and a broad range of ages. In further implementations, the population can be selected so as to match one or more characteristics of the subjects 1 to N, such as, for example, sex, age, and/or ethnicity. Thus, for example, if the subjects 1 to N are female and of an age between 40 and 50, the 3D anatomic shape reference model 110 that is used is generated using a population of females, between the ages of 40 and 50.

Figure 3:
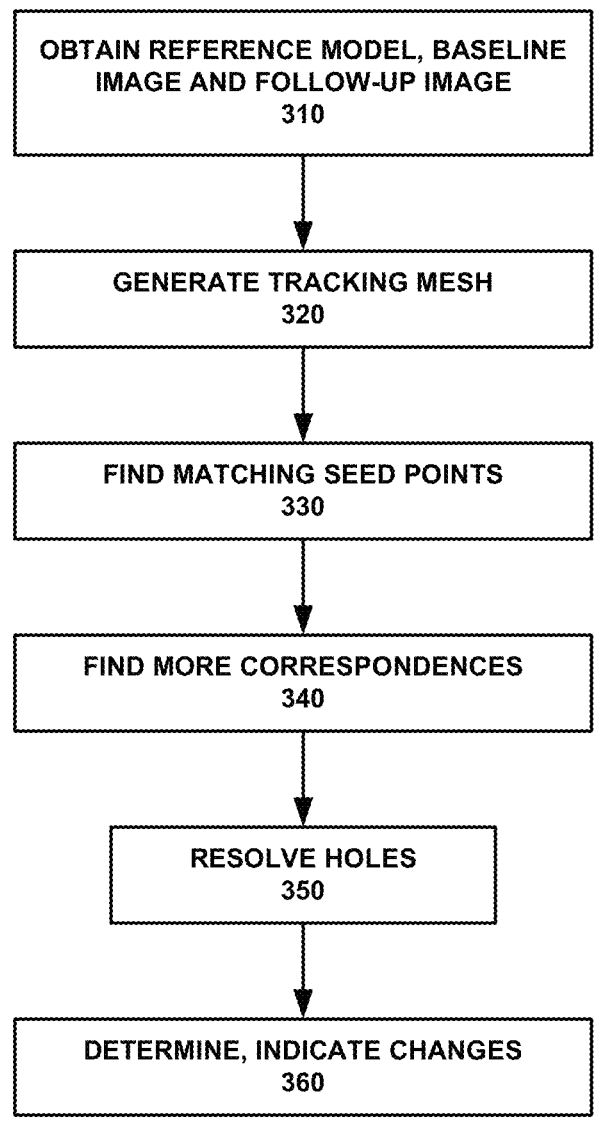
FIG. 3 is a flowchart of an exemplary procedure for tracking a region of interest between a baseline image of a subject and one or more follow-up images of the subject acquired subsequently to the baseline image.

The exemplary method depicted in FIG. 1 further includes an additional computer implemented procedure 300 to transfer the ROI from the baseline 3D images 120.1-120.N of the subjects to respective follow-up 3D images 121.1-121.N, 122.1-122.N, ... of the subjects acquired subsequently to the baseline images. As described in greater detail below, this additional procedure 300 reuses the results of the transfer procedure 200 of the ROI from the reference model 110 to the baseline images 120 to precisely transfer the ROI from the baseline images 120 to the respective follow-up images 121. An exemplary implementation of procedure 300 for transferring the ROI from the baseline 3D images 120 to the follow-up 3D images 121 is described below in greater detail with reference to FIG. 3.

Tracking, as used herein, connotes consistent and repeatable identification of a defined region in images taken at different times and with possibly different camera-to-subject angles and distances. It should also be noted that a 3D image, as used herein, refers to an image for which information about depth is available in addition to color for each pixel of the image. Unlike traditional, two-dimensional digital photography, the use of 3D imaging enables real world measurements to be determined from images and facilitates algorithms that can cope with differences in image perspective. Depth acquisition in imaging can be accomplished by a variety of technologies with active pattern projection and stereophotogrammetry being the two most common.

Figure 2:
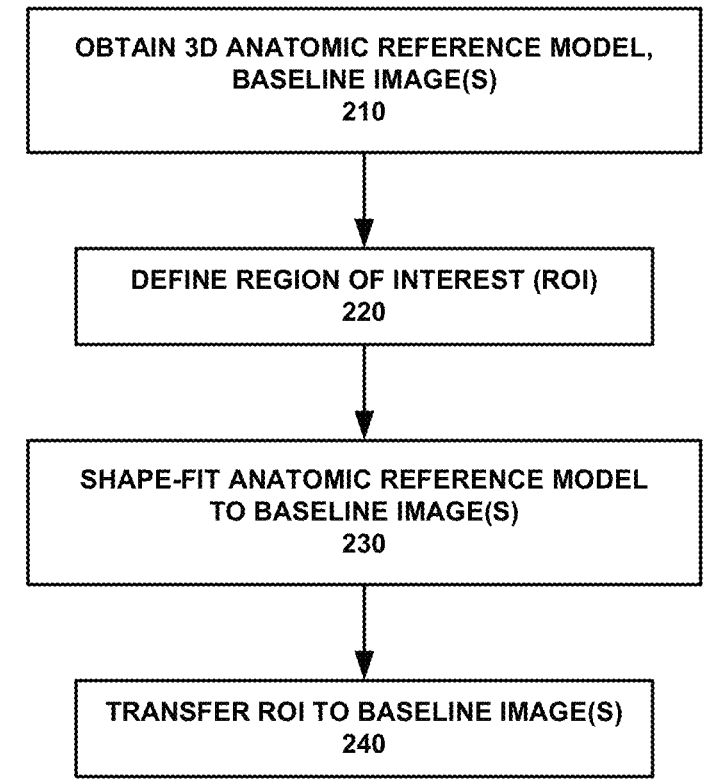
FIG. 2 is a flowchart of an exemplary procedure for transferring a region of interest from an anatomic reference model to a baseline image of each of a plurality of subjects.

Turning now to FIG. 2, exemplary procedure 200 for transferring an ROI from 3D anatomic shape reference model 110 to the baseline 3D image 120 of each of N subjects starts at 210 by obtaining the 3D anatomic shape reference model 110 and the baseline images 120. The reference model 110 can be generated as described above and baseline images 120 captured as 3D images. The reference model 110 can be one of multiple such models generated for a variety of subject characteristics and selected based on one or more such characteristics of the subjects whose baseline images 120 are obtained.

Given the 3D anatomic shape reference model 110, next an ROI to be assessed is defined at 220, which can be done in a variety of ways. The ROI is typically purpose-specific. For example, for assessing the efficacy of treatments of the forehead, an ROI such as that shown in FIG. 1 can be pre-defined and selected by a user from a library of previously defined template ROIs. Alternatively, the ROI can be defined by the user using a graphical user interface that allows the user to create or define the ROI on the reference model 110. The degree to which the definition or selection of the ROI is automated can vary among various implementations in accordance with the present disclosure. The same or different procedures can be used for defining an ROI directly on the baseline image 120 of a subject.

Once the assessment ROI has been defined on the 3D anatomic shape reference model 110, it is then transferred to the baseline image 120 of each of the N subjects. In the exemplary procedure shown, shape-fitting the 3D anatomic shape reference model 110 to the baseline image 120 of each of the subjects is performed at 230. In exemplary implementations, reference model 110 is first centered on the corresponding anatomic part (e.g., face) in the baseline image 120 of the subject. Next, a non-linear optimization is performed that minimizes the sum of squared distances between the 3D anatomic shape reference model 110 and the subject's baseline image 120. The objective of the optimization is to determine the right mix of weights for the shape encoding vectors in the 3D anatomic shape reference model 110. Each shape vector represents some highly varying characteristic of shape of the anatomic part, and thus performing this optimization yields a mix of plausible shape characteristics that most closely match the anatomic part of the subject. The outcome of the shape-fitting is a deformed version of anatomical reference model 110 that closely matches the shape features of the subject baseline image 120. The version of a model "A" deformed to a target shape "B", will be referred to herein as model "A_B"; i.e., the version of reference model 110 deformed to fit baseline image 120 is referred to as model 110_120.

Once reference model 110 (with the ROI as defined thereon in 220) has been deformed at 230 to fit baseline image 120, the transfer of the ROI to the baseline image 120 can be performed at 240 by projecting each boundary point of the ROI from model 110_120 to the baseline image 120.

After the ROI has been transferred to a baseline image 120 of a subject, such as with the procedure 200, the ROI can be transferred in procedure 300 from the baseline image 120 to a follow-up image 121 of the subject acquired subsequently to the baseline image. An exemplary implementation of such a procedure 300 will now be described with reference to FIG. 3.

Figure 4:
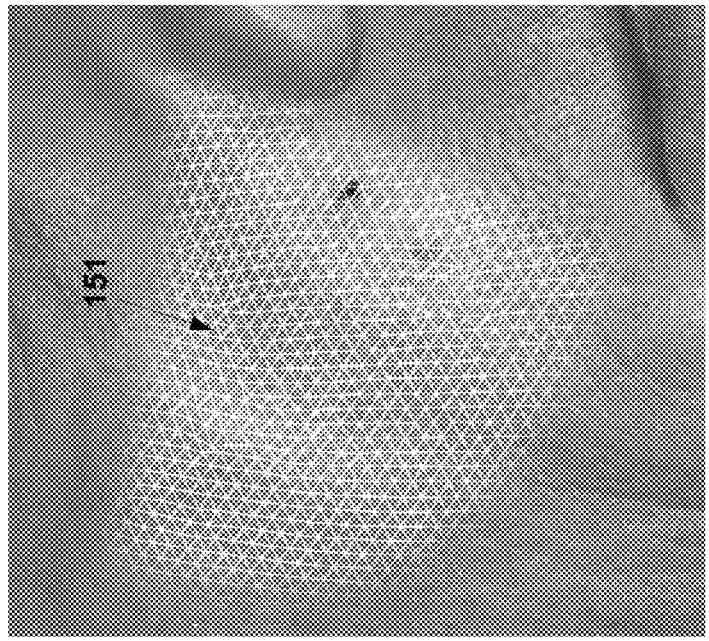
FIG. 4 shows an illustrative baseline image with a tracking mesh superimposed thereon and a corresponding follow-up image with the tracking mesh deformed.
Figure 4:
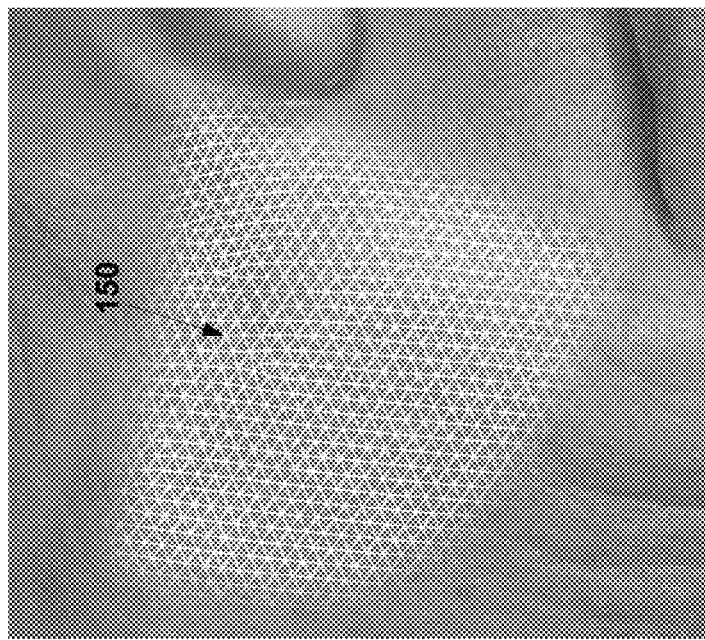

Procedure 300 starts at 310 with reference model 110, baseline image 120 and follow-up image 121 as inputs. At 320 a tracking mesh of a desired density is generated for baseline image 120. This tracking mesh will be used to establish a vertex to vertex correspondence between baseline image 120 and followup image 121. An illustrative such mesh is shown in FIG. 4 on baseline image 120 as mesh 150. Tracking mesh 150 can be generated, for example, by using the source 3D mesh of image 120. For example, tracking mesh 150 can be a subset of the source 3D mesh of image 120 that covers at least the ROI to be tracked. The tracking mesh density can be user specified, but other ways of determining a suitable mesh density can be employed, such as with the use of an automatic heuristic, for example. In exemplary implementations, with typical tracking mesh densities, the spacing between mesh vertices is typically 1.25-3.5 mm. Tracking mesh 150 can be generated with the use of a suitable remeshing algorithm that is able to generate a well behaved (e.g., isotropic) mesh that most closely matches an input shape despite having a different number of vertices/edges.

A further mesh that is generated as an outcome of procedure 300 is shown in FIG. 4 on follow-up image 121 as tracking result mesh 151. In exemplary implementations, the vertices of tracking result mesh 151 are placed at locations in follow-up image 121 identified as corresponding to the vertices of mesh 150 in accordance with a markerless tracking procedure that uses texture correlation. Such a procedure is described more fully below.

Operation then proceeds to 330 by finding matching "seed points" between images 120 and 121. A set of matching seed points comprises a tracking mesh vertex location on baseline image 120 and its corresponding location on follow-up images such as 121 and 122. Seed pointing establishes a sparse correspondence of matching locations between a subject's baseline image 120 and their follow-up images 121, 122.

Figure 5:
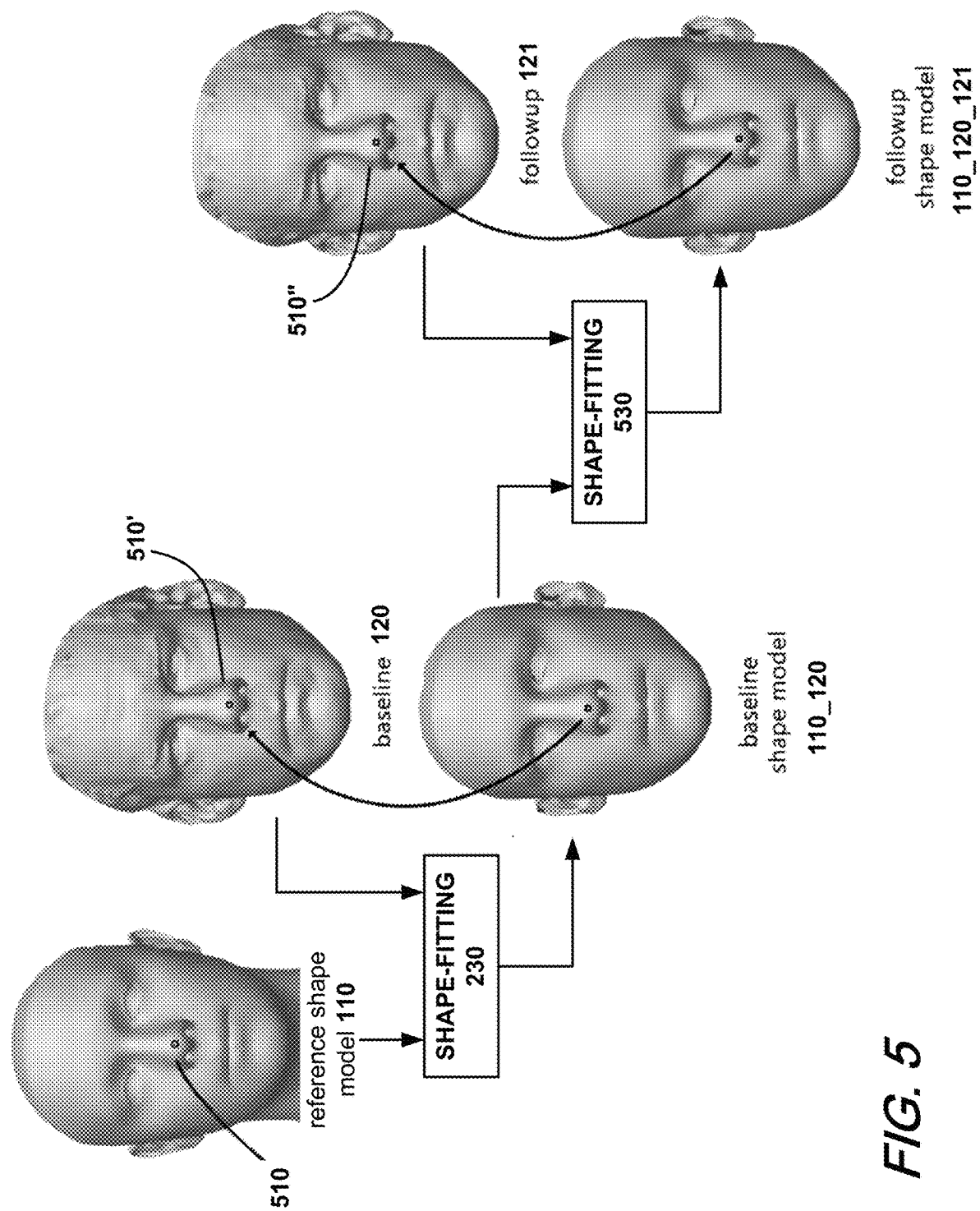
FIG. 5 is a schematic depiction of an exemplary procedure for finding matching seed points in accordance with the present disclosure.

An exemplary implementation of a procedure for finding matching seed points is illustrated in FIG. 5. As shown in FIG. 5, seed point 510 is selected on reference model 110 and corresponding seed points 510' and 510" on baseline and follow-up images 120 and 121, respectively, are then found. Seed point 510' on baseline image 120 can be found by projection from baseline model 110_120, which was generated as a result of the fitting procedure, performed at 230, by which the reference model 110 was deformed to fit baseline image 120. After fitting the reference model 110 to baseline image 120, the fit parameters of baseline model 110_120 can then be re-used to perform an additional fitting procedure 530, similar to that performed at 230, to deform baseline model 110_120 to fit the follow-up image 121, thereby generating follow-up model 110_120_121. Seed point 510" on follow-up image 121 can then be found using follow-up model 110_120_121. Alternatively, a follow-up model 110_121 can be generated by fitting reference model 110 to follow-up image 121 and seed point 510" on follow-up image 121 can be found using follow-up model 110_121. Fitting baseline model 110_120 to follow-up image 121, however, should result in a more consistent shape match to follow-up image 121 than would result by fitting the average anatomical shape of reference model 110 to follow-up image 121. For further follow-up images, such as image 122 shown in FIG. 1, shape fitting to follow-up image 122 can be done using baseline model 110_120 or the shape model of the follow-up image preceding image 122, which in this case would be follow-up model 110_120_121.

The procedure illustrated in FIG. 5 for one seed point 510, can be repeated for multiple seed points using reference model 110 and the shape models generated for the baseline image 120, and follow-up images 121, 122. In exemplary implementations, seed points are selected automatically by uniformly spaced sampling of reference model 110 with seed points spaced 10-50 mm apart, depending on the shape of the anatomical part modeled. This ensures full spatial coverage and preferably some redundancy in case some seed points do not result in valid matches.

The above-described processing results in a set of shape models, one for each image 120, 121, 122, etc., and multiple matched seed points establishing a coarse correspondence among the images.

Once matched seed points have been established, more correspondences between images 120 and 121, at least within the assessment ROI, are found at 340 by growing out from the matched seed points along tracking mesh 150 to find corresponding points in image 121. In exemplary implementations, correspondences between the two images are determined by optimizing an image matching score between the images. A matching score can be determined, for example, by a sum of squared differences between a "window" of pixels in image 120 and a similarly sized window of pixels in image 121. For example, each window can be a 5×5 box of pixels, or preferably an oriented ellipse selection of pixels. Preferably, the size of each window is comparable to the vertex spacing of tracking mesh 150. A first such window is centered on a vertex of tracking mesh 150 selected proximate to a first seed point. The algorithm then searches for a matching texture patch in a second such window in follow-up image 121 proximal to the corresponding seed point on image 121. The position of the matching image patch in follow-up image 121 is stored in the tracking result mesh 151. This operation is then repeated for additional vertices on tracking mesh 150 increasingly distal from the first seed point. Once all vertices on tracking mesh 150 within a vicinity of the first seed point have been processed accordingly, a further seed point is selected and the above-described processing repeated until all seed points have been processed. It should be noted that if a seed point correspondence were established inaccurately, the image-based matching procedure will likely fail and the process will proceed to the next unprocessed seed point.

The above-described optimization procedure of 340 iteratively optimizes the shape and location of windows in image 121 to best match the contents of windows in image 120. If the search does not find a suitably close match for a given window, the tracking mesh vertex about which that window is centered is skipped and may appear as a hole or a missed match. These holes can be resolved later at 350 through additional matching with looser match criteria or can be interpolated from surrounding matching points.

Figure 6:
FIG. 6 shows an illustrative follow-up image of a region of interest of a subject's face displayed with arrows superimposed thereon indicative of the changes in the face relative to the baseline image.

Once the tracking of the ROI from baseline image 120 to follow-up image 121 has been completed, operation then proceeds to 360 in which changes between the images are determined and indications thereof are generated. A result of the above-described processing is a determination of the correspondences between tracking mesh 150 of baseline image 120 and tracking result mesh 151 of follow-up image 121. The determination of said correspondences makes it possible to determine and to indicate, for each tracking mesh vertex, how the subject's imaged anatomical part, at least within the ROI, has changed between images 120 and 121. In an exemplary implementation, meshes 150 and 151 are aligned and vectors between corresponding vertices of the meshes computed. Visual representations of some or all of the vectors are then generated for display, preferably superimposed on baseline image 120 and/or follow-up image 121. As illustrated in FIG. 6, such visual representations can be implemented, for example, by an arrow for each pair of corresponding mesh vertices, with its tail at the vertex of mesh 150 of image 120 and its head at the corresponding vertex of mesh 151 of image 121, or any other suitable element arranged between corresponding mesh vertices in images 120 and 121. One or more characteristics of said visual representations, such as length, width, and/or color, for example, can be set as a function of the location, magnitude, and/or direction of the vectors represented. In the illustrative image of FIG. 6, the color of each arrow is set in accordance with its magnitude, thereby providing a further visual indication of the degree of displacement of individual vertices in the follow-up image relative to the baseline image.

In further implementations, changes between images 120 and 121 in stretch, compression, and/or surface area can be measured and displayed graphically and/or alphanumerically.

For additional follow-up images such as image 122, the above-described operations can be repeated for each follow-up image, with the matching seed points and additional correspondences (at 330 and 340) being established with baseline image 120. In some cases, said correspondences may preferably be established with a preceding follow-up image if the change relative to baseline image 120 is too great and a preceding follow-up image would provide a better match. In any case, once the correspondences between the baseline and follow-up images of a subject have been established, the changes between any two of the images can be determined and displayed, as described above. Changes between images or among a sequence of images can also be displayed in an animation.

Figure 7:
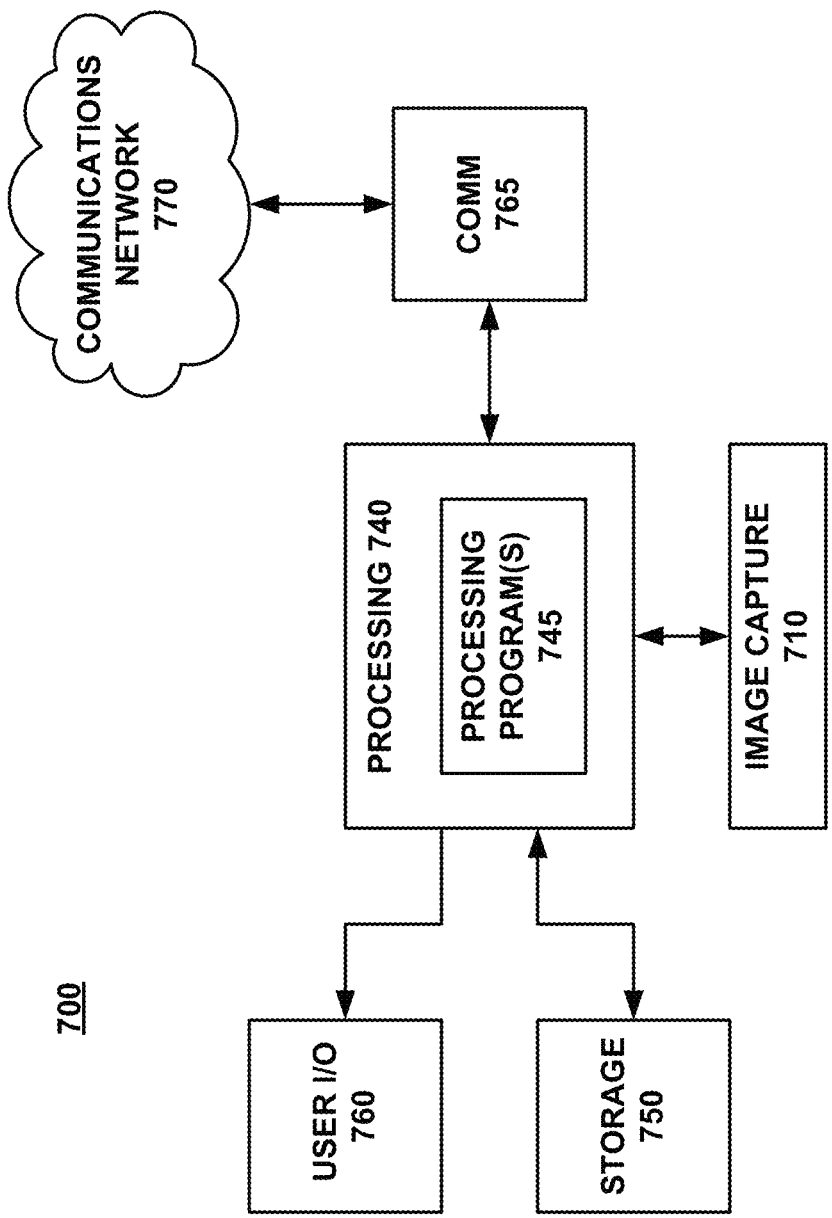
FIG. 7 schematically depicts an exemplary system in accordance with the present disclosure.

Turning now to FIG. 7, there is shown in schematic form an exemplary imaging system 700 in accordance with the present disclosure. As shown in FIG. 7, components of system 700 include an image capture system 710 coupled to processing circuitry 740. Image capture system 710 may include one or more hand-held or mounted point-and-shoot or DSLR cameras, mobile cameras, frontal or rear-facing smart-device cameras, dermatoscopes (e.g., Canfield Scientific Inc.'s VEOS), 2D skin imaging systems (e.g., Canfield Scientific Inc.'s VISIA), 3D human body imaging devices (e.g., Canfield Scientific Inc.'s VECTRA), and/or 3D Total Body systems (e.g., Canfield Scientific Inc.'s WB360), 3D volumetric imaging devices, among others. Image capture system 710 can be used to capture the various images described above, such as the images used to generate 3D anatomic shape reference model 110, as well as baseline and follow-up images 120 and 121.

Advantageously, the captured images can be single mode or multimodal—including, for example, those from standard white light, polarized light, and/or fluorescent light—captured at selected wavelengths and/or illuminated with selected wavelengths of light.

Images captured by image capture system 710 are provided to processing circuitry 740 for processing as described above. Of further advantage, processing circuitry 740 may also control image capture system 710, for example, by controlling one or more aspects of the image capture and/or illumination of the subject, such as exposure, modality, or filtering, among others.

Images may also be provided to processing circuitry 740 from other sources and by other means. For example, images may be provided via communications network 770, or in a non-transient storage medium, such as storage 750.

Processing circuitry 740 may be coupled to: storage 750, for storing and retrieving images and shape models, among other data, and/or programs, software, and firmware, among other forms of processing instructions; and to input/output devices 760, such as a display device and/or user input devices, such as a keyboard, mouse, or the like. Processing circuitry 740 may also be coupled to a communications module 765 for interconnection with a communications network 770, such as the Internet, for transmitting and receiving images and/or data, and/or receiving commands, software updates or the like. Processing circuitry 740, storage 750, I/O 760, and/or communications module 765 may be implemented, for example, with one or more computers, workstations, processors, or the like, operating in accordance with one or more programs 745 embodied in a compatible, non-transient, machine-readable storage medium. Program(s) 745 may be stored in storage 750 and/or other memory devices (not shown), and provided therefrom and/or from communications network 770, via module 765, to processing circuitry 740 for execution.

It should be noted that the exemplary system 700 illustrates just one of a variety of possible arrangements contemplated by the present disclosure. For example, the various modules of system 700 need not be co-located. For example, image capture system 710 and I/O devices 760 can be located in a dermatologist's office and processing circuitry 740 and storage module 750 can be remotely located, functioning within a tele-dermatology framework, or "cloud-based," interacting with image capture system 710 and I/O devices 760 over communications network 770. In other exemplary arrangements, I/O devices 760 can be remotely located from image capture system 710, thereby allowing a user to remotely examine subjects' images.

Combinations/Examples

A. An anatomical imaging apparatus comprising:
a storage device containing instructions; and
a processor for executing the instructions to:
obtain a reference model including a reference anatomical region;
obtain first and second images of a subject anatomical region corresponding to the reference anatomical region, the second image having been captured after the first image;
determine a correspondence relationship between the first and second images by using the reference model; and
control a display device to display at least one of the first and second images so as to indicate the correspondence relationship.

B. The apparatus of paragraph A, wherein the reference model and the first and second images are three-dimensional.

C. The apparatus of any preceding paragraph, wherein the storage device contains instructions for execution by the processor to:
obtain a region of interest (ROI) on the reference model including the reference anatomical region, and
transfer the ROI to at least one of the first and second images.

D. The apparatus of any preceding paragraph, wherein the storage device contains instructions for execution by the processor to:
obtain a plurality of further first images of a plurality of subjects' respective anatomical regions corresponding to the reference anatomical region; and
transfer the ROI to the plurality of further first images.

E. The apparatus of any preceding paragraph, wherein the reference model is derived from a population of subjects having at least one characteristic in common with a subject of the subject anatomical region.

F. The apparatus of any preceding paragraph, wherein determining a correspondence relationship between the first and second images includes:
fitting the reference model to the first image of the subject anatomical region to generate a first deformed model; and
fitting at least one of the reference model and the first deformed model to the second image of the subject anatomical region to generate a second deformed model.

G. The apparatus of any preceding paragraph, wherein determining a correspondence relationship between the first and second images includes:

determining corresponding seed points in the first and second images using the first and second deformed models; and determining corresponding mesh vertices proximate to the matching seed points in the first and second images.

H. The apparatus of any preceding paragraph, wherein determining corresponding seed points includes:

determining a first point of the first deformed model and a second point of the second deformed model that correspond to the same point on the reference model;

determining a first location in the first image corresponding to the first point of the first deformed model; and determining a second location in the second image corresponding to the second point of the first deformed model, wherein the corresponding seed points are at the first and second locations.

I. The apparatus of any preceding paragraph, wherein determining corresponding mesh vertices includes:

selecting a first area surrounding a first mesh vertex of the first image; and finding a second area of the second image that is correlated to the first area, the second area surrounding a second mesh vertex of the second image, wherein the first and second mesh vertices are corresponding mesh vertices.

J. The apparatus of any preceding paragraph, wherein indicating the correspondence relationship includes:

determining one or more differences between the first and second images; and generating a visual representation of the one or more differences for display by the display device.

K. The apparatus of any preceding paragraph, wherein the storage device contains instructions for execution by the processor to:

obtain a third image of the subject anatomical region corresponding to the reference anatomical region, the third image having been captured after the second image;

determine a correspondence relationship between at least one of the first and second images and the third image by using the reference model; and control the display device to display the third image and at least one of the first and second images so as to indicate the correspondence relationship between the third image and at least one of the first and second images.

L. A method performed by an anatomical imaging apparatus comprising:

obtaining a reference model including a reference anatomical region;

obtaining first and second images of a subject anatomical region corresponding to the reference anatomical region, the second image having been captured after the first image;

determining a correspondence relationship between the first and second images by using the reference model; and controlling a display device to display at least one of the first and second images so as to indicate the correspondence relationship.

M. The method of paragraph L, wherein the reference model and the first and second images are three-dimensional.

N. The method of any preceding paragraph, comprising:

obtaining a region of interest (ROI) on the reference model including the reference anatomical region, and transferring the ROI to at least one of the first and second images.

O. The method of any preceding paragraph, comprising:

obtaining a plurality of further first images of a plurality of subjects' respective anatomical regions corresponding to the reference anatomical region; and transferring the ROI to the plurality of further first images.

P. The method of any preceding paragraph, wherein the reference model is derived from a population of subjects having at least one characteristic in common with a subject of the subject anatomical region.

Q. The method of any preceding paragraph, wherein determining a correspondence relationship between the first and second images includes:

fitting the reference model to the first image of the subject anatomical region to generate a first deformed model; and fitting at least one of the reference model and the first deformed model to the second image of the subject anatomical region to generate a second deformed model.

R. The method of any preceding paragraph, wherein determining a correspondence relationship between the first and second images includes:

determining corresponding seed points in the first and second images using the first and second deformed models; and determining corresponding mesh vertices proximate to the matching seed points in the first and second images.

S. The method of any preceding paragraph, wherein determining corresponding seed points includes:

determining a first point of the first deformed model and a second point of the second deformed model that correspond to the same point on the reference model;

determining a first location in the first image corresponding to the first point of the first deformed model; and determining a second location in the second image corresponding to the second point of the first deformed model, wherein the corresponding seed points are at the first and second locations.

T. The method of any preceding paragraph, wherein determining corresponding mesh vertices includes:

selecting a first area surrounding a first mesh vertex of the first image; and finding a second area of the second image that is correlated to the first area, the second area surrounding a second mesh vertex of the second image, wherein the first and second mesh vertices are corresponding mesh vertices.

U. The method of any preceding paragraph, wherein indicating the correspondence relationship includes:

determining one or more differences between the first and second images; and generating a visual representation of the one or more differences for display by the display device.

V. The method of any preceding paragraph, comprising:

obtaining a third image of the subject anatomical region corresponding to the reference anatomical region, the third image having been captured after the second image;

determining a correspondence relationship between at least one of the first and second images and the third image by using the reference model; and controlling the display device to display the third image and at least one of the first and second images so as to indicate the correspondence relationship between the third image and at least one of the first and second images.

W. A non-transient computer readable storage medium containing instructions for execution by a processor for carrying out the method of any preceding paragraph.

The foregoing merely illustrates principles of the invention and it will thus be appreciated that those skilled in the art will be able to devise numerous alternative arrangements which, although not explicitly described herein, embody the principles of the invention and are within its spirit and scope. In addition, as can be appreciated, while specific implementations have been described above with respect to the assessment of skin treatment efficacy, there are multiple applications entailing the comparison of images of skin and/or other anatomical features, whether of the same subject or multiple subjects, that could benefit from the techniques disclosed herein, including, for example, facial recognition, or assessing the effects of aging or trauma, among other possibilities.

Additionally, although illustrated as single elements, each block, step, or element shown may be implemented with multiple blocks, steps, or elements, or various combinations thereof. Also terms such as "software," "application," "program," "firmware," or the like, are intended to refer, without limitation, to any instruction or set of instructions, structure, or logic embodied in any suitable machine-readable medium. It is to be understood that numerous modifications may be made to the illustrative embodiments and that other arrangements may be devised without departing from the spirit and scope of the present invention as defined by the appended claims.

What is claimed is:

1. An anatomical imaging apparatus comprising:
a storage device containing instructions; and
a processor for executing the instructions to:
obtain a reference model including a reference anatomical region;
obtain first and second images of a subject anatomical region corresponding to the reference anatomical region, the second image having been captured after the first image;
determine a correspondence relationship between the first and second images by using the reference model; and
control a display device to display at least one of the first and second images so as to indicate the correspondence relationship;
wherein the reference model is derived from a population of subjects having at least one characteristic in common with a subject of the subject anatomical region.

2. The apparatus of claim 1, wherein the reference model and the first and second images are three-dimensional.

3. The apparatus of claim 1, wherein the storage device contains instructions for execution by the processor to:
obtain a region of interest (ROI) on the reference model including the reference anatomical region, and
transfer the ROI to at least one of the first and second images.

4. The apparatus of claim 3, wherein the storage device contains instructions for execution by the processor to:
obtain a plurality of further first images of a plurality of subjects' respective anatomical regions corresponding to the reference anatomical region; and
transfer the ROI to the plurality of further first images.

5. The apparatus of claim 1, wherein determining a correspondence relationship between the first and second images includes:
fitting the reference model to the first image of the subject anatomical region to generate a first deformed model; and
fitting at least one of the reference model and the first deformed model to the second image of the subject anatomical region to generate a second deformed model.

6. The apparatus of claim 5, wherein determining a correspondence relationship between the first and second images includes:
determining corresponding seed points in the first and second images using the first and second deformed models; and
determining corresponding mesh vertices proximate to the matching seed points in the first and second images.

7. The apparatus of claim 6, wherein determining corresponding seed points includes:
determining a first point of the first deformed model and a second point of the second deformed model that correspond to the same point on the reference model;
determining a first location in the first image corresponding to the first point of the first deformed model; and
determining a second location in the second image corresponding to the second point of the first deformed model,
wherein the corresponding seed points are at the first and second locations.

8. The apparatus of claim 6, wherein determining corresponding mesh vertices includes:
selecting a first area surrounding a first mesh vertex of the first image; and
finding a second area of the second image that is correlated to the first area, the second area surrounding a second mesh vertex of the second image,
wherein the first and second mesh vertices are corresponding mesh vertices.

9. The apparatus of claim 1, wherein indicating the correspondence relationship includes:
determining one or more differences between the first and second images; and
generating a visual representation of the one or more differences for display by the display device.

10. The apparatus of claim 1, wherein the storage device contains instructions for execution by the processor to:
obtain a third image of the subject anatomical region corresponding to the reference anatomical region, the third image having been captured after the second image;
determine a correspondence relationship between at least one of the first and second images and the third image by using the reference model; and
control the display device to display the third image and at least one of the first and second images so as to indicate the correspondence relationship between the third image and at least one of the first and second images.

11. The apparatus of claim 1, wherein the storage device contains instructions for execution by the processor to generate at least one measurement indicative of the correspondence relationship between the first and second images.

12. A method performed by an anatomical imaging apparatus comprising:
obtaining a reference model including a reference anatomical region;
obtaining first and second images of a subject anatomical region corresponding to the reference anatomical region, the second image having been captured after the first image;
determining a correspondence relationship between the first and second images by using the reference model; and
controlling a display device to display at least one of the first and second images so as to indicate the correspondence relationship, wherein the reference model is derived from a population of subjects having at least one characteristic in common with a subject of the subject anatomical region.

13. The method of claim 12, wherein the reference model and the first and second images are three-dimensional.

14. The method of claim 12, comprising:
obtaining a region of interest (ROI) on the reference model including the reference anatomical region, and
transferring the ROI to at least one of the first and second images.

15. The method of claim 14, comprising:
obtaining a plurality of further first images of a plurality of subjects' respective anatomical regions corresponding to the reference anatomical region; and
transferring the ROI to the plurality of further first images.

16. The method of claim 12, wherein determining a correspondence relationship between the first and second images includes:
fitting the reference model to the first image of the subject anatomical region to generate a first deformed model; and
fitting at least one of the reference model and the first deformed model to the second image of the subject anatomical region to generate a second deformed model.

17. The method of claim 16, wherein determining a correspondence relationship between the first and second images includes:
determining corresponding seed points in the first and second images using the first and second deformed models; and
determining corresponding mesh vertices proximate to the matching seed points in the first and second images.

18. The method of claim 17, wherein determining corresponding seed points includes:
determining a first point of the first deformed model and a second point of the second deformed model that correspond to the same point on the reference model;
determining a first location in the first image corresponding to the first point of the first deformed model; and
determining a second location in the second image corresponding to the second point of the first deformed model,
wherein the corresponding seed points are at the first and second locations.

19. The method of claim 17, wherein determining corresponding mesh vertices includes:
selecting a first area surrounding a first mesh vertex of the first image; and
finding a second area of the second image that is correlated to the first area, the second area surrounding a second mesh vertex of the second image,
wherein the first and second mesh vertices are corresponding mesh vertices.

20. The method of claim 12, wherein indicating the correspondence relationship includes:
determining one or more differences between the first and second images; and
generating a visual representation of the one or more differences for display by the display device.

21. The method of claim 12, comprising:
obtaining a third image of the subject anatomical region corresponding to the reference anatomical region, the third image having been captured after the second image;
determining a correspondence relationship between at least one of the first and second images and the third image by using the reference model; and
controlling the display device to display the third image and at least one of the first and second images so as to indicate the correspondence relationship between the third image and at least one of the first and second images.

22. A non-transient computer readable storage medium containing instructions for execution by a processor for carrying out the method of claim 12.

23. The method of claim 12 comprising generating at least one measurement indicative of the correspondence relationship between the first and second images.

24. An anatomical imaging apparatus comprising:
a storage device containing instructions; and
a processor for executing the instructions to:
obtain a reference model including a reference anatomical region;
obtain first and second images of a subject anatomical region corresponding to the reference anatomical region, the second image having been captured after the first image;
determine a correspondence relationship between the first and second images by using the reference model; and
control a display device to display at least one of the first and second images so as to indicate the correspondence relationship, wherein indicating the correspondence relationship includes:
determining one or more differences between the first and second images; and
generating a visual representation of the one or more differences for display by the display device.

25. The apparatus of claim 24, wherein the reference model and the first and second images are three-dimensional.

26. The apparatus of claim 24, wherein the storage device contains instructions for execution by the processor to:
obtain a region of interest (ROI) on the reference model including the reference anatomical region, and
transfer the ROI to at least one of the first and second images.

27. The apparatus of claim 26, wherein the storage device contains instructions for execution by the processor to:
obtain a plurality of further first images of a plurality of subjects' respective anatomical regions corresponding to the reference anatomical region; and
transfer the ROI to the plurality of further first images.

28. The apparatus of claim 24, wherein determining a correspondence relationship between the first and second images includes:
fitting the reference model to the first image of the subject anatomical region to generate a first deformed model; and
fitting at least one of the reference model and the first deformed model to the second image of the subject anatomical region to generate a second deformed model.

29. The apparatus of claim 28, wherein determining a correspondence relationship between the first and second images includes:
determining corresponding seed points in the first and second images using the first and second deformed models; and
determining corresponding mesh vertices proximate to the matching seed points in the first and second images.

30. The apparatus of claim 29, wherein determining corresponding seed points includes:
   determining a first point of the first deformed model and a second point of the second deformed model that correspond to the same point on the reference model;
   determining a first location in the first image corresponding to the first point of the first deformed model; and
   determining a second location in the second image corresponding to the second point of the first deformed model,
   wherein the corresponding seed points are at the first and second locations.

31. The apparatus of claim 29, wherein determining corresponding mesh vertices includes:
   selecting a first area surrounding a first mesh vertex of the first image; and
   finding a second area of the second image that is correlated to the first area, the second area surrounding a second mesh vertex of the second image,
   wherein the first and second mesh vertices are corresponding mesh vertices.

32. The apparatus of claim 24, wherein the storage device contains instructions for execution by the processor to:
   obtain a third image of the subject anatomical region corresponding to the reference anatomical region, the third image having been captured after the second image;
   determine a correspondence relationship between at least one of the first and second images and the third image by using the reference model; and
   control the display device to display the third image and at least one of the first and second images so as to indicate the correspondence relationship between the third image and at least one of the first and second images.

33. The apparatus of claim 24, wherein the storage device contains instructions for execution by the processor to generate at least one measurement indicative of the correspondence relationship between the first and second images.

34. A method performed by an anatomical imaging apparatus comprising:
   obtaining a reference model including a reference anatomical region;
   obtaining first and second images of a subject anatomical region corresponding to the reference anatomical region, the second image having been captured after the first image;
   determining a correspondence relationship between the first and second images by using the reference model; and
   controlling a display device to display at least one of the first and second images so as to indicate the correspondence relationship, wherein indicating the correspondence relationship includes:
      determining one or more differences between the first and second images; and
      generating a visual representation of the one or more differences for display by the display device.

35. The method of claim 34, wherein the reference model and the first and second images are three-dimensional.

36. The method of claim 34, comprising:
   obtaining a region of interest (ROI) on the reference model including the reference anatomical region, and
   transferring the ROI to at least one of the first and second images.

37. The method of claim 36, comprising:
   obtaining a plurality of further first images of a plurality of subjects' respective anatomical regions corresponding to the reference anatomical region; and
   transferring the ROI to the plurality of further first images.

38. The method of claim 34, wherein determining a correspondence relationship between the first and second images includes:
   fitting the reference model to the first image of the subject anatomical region to generate a first deformed model; and
   fitting at least one of the reference model and the first deformed model to the second image of the subject anatomical region to generate a second deformed model.

39. The method of claim 38, wherein determining a correspondence relationship between the first and second images includes:
   determining corresponding seed points in the first and second images using the first and second deformed models; and
   determining corresponding mesh vertices proximate to the matching seed points in the first and second images.

40. The method of claim 39, wherein determining corresponding seed points includes:
   determining a first point of the first deformed model and a second point of the second deformed model that correspond to the same point on the reference model;
   determining a first location in the first image corresponding to the first point of the first deformed model; and
   determining a second location in the second image corresponding to the second point of the first deformed model,
   wherein the corresponding seed points are at the first and second locations.

41. The method of claim 39, wherein determining corresponding mesh vertices includes:
   selecting a first area surrounding a first mesh vertex of the first image; and
   finding a second area of the second image that is correlated to the first area, the second area surrounding a second mesh vertex of the second image,
   wherein the first and second mesh vertices are corresponding mesh vertices.

42. The method of claim 34, comprising:
   obtaining a third image of the subject anatomical region corresponding to the reference anatomical region, the third image having been captured after the second image;
   determining a correspondence relationship between at least one of the first and second images and the third image by using the reference model; and
   controlling the display device to display the third image and at least one of the first and second images so as to indicate the correspondence relationship between the third image and at least one of the first and second images.

43. The method of claim 34 comprising generating at least one measurement indicative of the correspondence relationship between the first and second images.

44. A non-transient computer readable storage medium containing instructions for execution by a processor for carrying out the method of claim 34.

45. An anatomical imaging apparatus comprising:
   a storage device containing instructions; and
   a processor for executing the instructions to:
      obtain a reference model including a reference anatomical region;

obtain first and second images of a subject anatomical region corresponding to the reference anatomical region, the second image having been captured after the first image;
determine a correspondence relationship between the first and second images by using the reference model; and
control a display device to display at least one of the first and second images so as to indicate the correspondence relationship,
wherein determining a correspondence relationship between the first and second images includes:
fitting the reference model to the first image of the subject anatomical region to generate a first deformed model;
fitting at least one of the reference model and the first deformed model to the second image of the subject anatomical region to generate a second deformed model;
determining corresponding seed points in the first and second images using the first and second deformed models; and
determining corresponding mesh vertices proximate to the matching seed points in the first and second images, wherein determining corresponding mesh vertices includes:
selecting a first area surrounding a first mesh vertex of the first image; and
finding a second area of the second image that is correlated to the first area, the second area surrounding a second mesh vertex of the second image,
wherein the first and second mesh vertices are corresponding mesh vertices.

46. The apparatus of claim 45, wherein the reference model and the first and second images are three-dimensional.

47. The apparatus of claim 45, wherein the storage device contains instructions for execution by the processor to:
obtain a region of interest (ROI) on the reference model including the reference anatomical region, and
transfer the ROI to at least one of the first and second images.

48. The apparatus of claim 47, wherein the storage device contains instructions for execution by the processor to:
obtain a plurality of further first images of a plurality of subjects' respective anatomical regions corresponding to the reference anatomical region; and
transfer the ROI to the plurality of further first images.

49. The apparatus of claim 45, wherein determining corresponding seed points includes:
determining a first point of the first deformed model and a second point of the second deformed model that correspond to the same point on the reference model;
determining a first location in the first image corresponding to the first point of the first deformed model; and
determining a second location in the second image corresponding to the second point of the first deformed model,
wherein the corresponding seed points are at the first and second locations.

50. The apparatus of claim 45, wherein the storage device contains instructions for execution by the processor to:
obtain a third image of the subject anatomical region corresponding to the reference anatomical region, the third image having been captured after the second image;
determine a correspondence relationship between at least one of the first and second images and the third image by using the reference model; and
control the display device to display the third image and at least one of the first and second images so as to indicate the correspondence relationship between the third image and at least one of the first and second images.

51. The apparatus of claim 45, wherein the storage device contains instructions for execution by the processor to generate at least one measurement indicative of the correspondence relationship between the first and second images.

52. A method performed by an anatomical imaging apparatus comprising:
obtaining a reference model including a reference anatomical region;
obtaining first and second images of a subject anatomical region corresponding to the reference anatomical region, the second image having been captured after the first image;
determining a correspondence relationship between the first and second images by using the reference model; and
controlling a display device to display at least one of the first and second images so as to indicate the correspondence relationship,
wherein determining a correspondence relationship between the first and second images includes:
fitting the reference model to the first image of the subject anatomical region to generate a first deformed model;
fitting at least one of the reference model and the first deformed model to the second image of the subject anatomical region to generate a second deformed model;
determining corresponding seed points in the first and second images using the first and second deformed models; and
determining corresponding mesh vertices proximate to the matching seed points in the first and second images, wherein determining corresponding mesh vertices includes:
selecting a first area surrounding a first mesh vertex of the first image; and
finding a second area of the second image that is correlated to the first area, the second area surrounding a second mesh vertex of the second image,
wherein the first and second mesh vertices are corresponding mesh vertices.

53. The method of claim 52, wherein the reference model and the first and second images are three-dimensional.

54. The method of claim 52, comprising:
obtaining a region of interest (ROI) on the reference model including the reference anatomical region, and
transferring the ROI to at least one of the first and second images.

55. The method of claim 54, comprising:
obtaining a plurality of further first images of a plurality of subjects' respective anatomical regions corresponding to the reference anatomical region; and
transferring the ROI to the plurality of further first images.

56. The method of claim 52, wherein determining corresponding seed points includes:
determining a first point of the first deformed model and a second point of the second deformed model that correspond to the same point on the reference model;

determining a first location in the first image corresponding to the first point of the first deformed model; and
determining a second location in the second image corresponding to the second point of the first deformed model,
wherein the corresponding seed points are at the first and second locations.

57. The method of claim 52, comprising:
obtaining a third image of the subject anatomical region corresponding to the reference anatomical region, the third image having been captured after the second image;
determining a correspondence relationship between at least one of the first and second images and the third image by using the reference model; and
controlling the display device to display the third image and at least one of the first and second images so as to indicate the correspondence relationship between the third image and at least one of the first and second images.

58. The method of claim 52 comprising generating at least one measurement indicative of the correspondence relationship between the first and second images.

59. A non-transient computer readable storage medium containing instructions for execution by a processor for carrying out the method of claim 52.

* * * * *